Sept. 22, 1970 K. E. CHILCOAT 3,529,810

SCREEN DISC HUMIDIFIER

Filed July 29, 1968 6 Sheets-Sheet 1

INVENTOR.
KERMIT E. CHILCOAT

BY Teagno & Toddy

ATTORNEY

Sept. 22, 1970 K. E. CHILCOAT 3,529,810

SCREEN DISC HUMIDIFIER

Filed July 29, 1968 6 Sheets-Sheet 2

INVENTOR.
KERMIT E. CHILCOAT

BY [signature]

ATTORNEY

SCREEN DISC HUMIDIFIER

Filed July 29, 1968 6 Sheets-Sheet 3

INVENTOR.
KERMIT E. CHILCOAT

BY Teagno & Toddy

ATTORNEY

INVENTOR
KERMIT E. CHILCOAT
BY Teagno & Toddy
ATTORNEY

INVENTOR
BY KERMIT E. CHILCOAT
Teagno & Toddy
ATTORNEY

SCREEN DISC HUMIDIFIER

Filed July 29, 1968 6 Sheets-Sheet 6

INVENTOR.
KERMIT E. CHILCOAT
BY Teagno & Toddy
ATTORNEY

United States Patent Office 3,529,810
Patented Sept. 22, 1970

3,529,810

SCREEN DISC HUMIDIFIER

Kermit E. Chilcoat, North Olmsted, Ohio, assignor to Eaton Yale & Towne Inc., Cleveland, Ohio, a corporation of Ohio Filed July 29, 1968, Ser. No. 748,541
Int. Cl. B01d *1/14*
U.S. Cl. 261—92 15 Claims

ABSTRACT OF THE DISCLOSURE

A humidifier for adding liquid vapor to a moving fluid stream having a rotating screen disc media for transferring liquid from a liquid reservoir to the moving fluid stream for vaporization thereby. The humidifier including a stacked disc media pack with spacing between individual discs being provided by raised portions of an adjacent disc. Also included in the humidifier is a disc drive assembly having a configured drive shaft and resilient mating cooperation of the discs with the drive shaft to provide a coupling therebetween. The disc pack and drive assembly including the drive shaft are coupled to a rotary power source through a flexible drive and liquid shield coupling member. A damper is provided for use with the humidifier to provide fluid stream diversion, the damper being unitary while positionally adjustable with respect to the humidifier. The humidifier is further provided with means for preventing scaling due to precipitation of dissolved minerals.

BACKGROUND OF INVENTION

Field of invention

This invention relates to a liquid to gas transfer mechanism of the type generally used for increasing the humidity of a heated air stream, said mechanism being further characterized by the use of a rotating liquid to vapor transfer media passing through a liquid reservoir and carrying a portion of the liquid into a moving air stream where the liquid is then vaporized and transferred to the air stream. More particularly, this invention relates to a mechanism of the type described wherein there is provided a novel liquid transfer media and drive mechanism therefor.

DESCRIPTION OF THE PRIOR ART

Humidifiers of the type having a perforated metal disc are generally old in the art.

An early example of such a humidifier is U.S. Pat. 862,541 issued Aug. 6, 1907, to F. B. Comins wherein there is disclosed a generally bowl-shaped frame member rotatably supported for rotation through a liquid filled reservoir. The bowl-shaped frame member is covered with a perforated metal disc conforming generally to the bowl configuration of the frame. A fan was provided to force air into the housing supporting the rotating perforated disc member. As the perforated disc member passed through the liquid reservoir an amount of liquid was retained on the perforated disc member as it was rotated from the liquid reservoir. This liquid was then vaporized by the action of the forced air passing through the housing. The Comins patent further anticipates the use of a woven wire screen disc as a replacement for the bowl-shaped frame and perforated metal disc covering thereof.

On Dec. 23, 1930 Pat. 1,786,200 was issued to C. Ferguson wherein there is disclosed a rotating disc humidifier having a plurality of woven wire screen discs mounted on a rotatable shaft for passage through a liquid filled reservoir. Fan means were also provided for forcing air into contact with the rotating screen discs for the purpose of vaporizing the liquid adhering thereto with the intent of humidifying the air passing through the humidifier housing. The Ferguson patent further discloses the displacement of the rotating disc pack such that the individual discs are substantially parallel and are further substantially parallel to the direction of the flowing air. In the Ferguson patent the plurality of rotating discs were spaced one from the other by a plurality of spacing elements located between individual discs on the rotating shaft.

Rotating disc humidifiers of the type generally disclosed in the above patents were further modified in a patent issued Aug. 19, 1941, Pat. 2,253,418 to Mr. M. Crandall et al., wherein there is disclosed a combination substantially similar to that disclosed in the Ferguson patent having a housing defining a fluid reservoir, a plurality of shaft-mounted perforated metal discs, and fan means for forcing the air past the rotating discs, said air flow being substantially parallel to the plane of the rotating discs. However, the Crandall et al. patent discloses the use of disc spacing means comprising hinged tabs formed as a result of a perforating method whereby the hinged tabs extend generally perpendicularly from the surface of the disc. When a plurality of discs are assembled on a shaft therefore, the hinged tabs serve as spacers to maintain the discs in a proper spaced relationship.

The Crandall et al. patent further discloses in separate embodiments the possibility of coning the discs in order to obtain air flow directional changes and insure more thorough contact of the flowing air with the discs in order to obtain a more efficient vaporization of the liquid.

A later improvent in rotating disc type humidifiers is disclosed in U.S. Pat. 3,190,624 issued June 22, 1965 to E. J. McElreath wherein there is dislosed two methods of improving the efficiency of humidifiers utilizing a rotating screen disc media pack.

One method of improving the efficiency described in the patent is to mount the screen discs on a shaft which is transverse to the air flow with the discs being positioned in planes forming a small angle with a plane transverse to the axis of the shaft. Whereby, as the shaft and screen discs are rotated slowly through the liquid reservoir, the planar surfaces of the discs form, with respect to the air flow path, a continually varying angle such that the air path is continually varying as it passes the rotating discs thereby creating a degree of air turbulence to increase the efficiency of evaporation of the liquid from the rotating screen discs.

A further method of increasing the efficiency of liquid evaporation, disclosed in the McElreath patent, was to provide the rotating screen discs with radially extending slots which performed the function of increasing the flexibility of the rotating screen discs to allow flexing thereof to remove the tendency of dissolved minerals to build up on the screen wire and prevent a decrease in the efficiency of humidification.

As implied from the disclosure in the McElreath patent, it is a natural tendency of the flowing air to avoid flowing through the mesh of the wire screen discs because of the pressure drop existing thereacross. The result of the tendency of flowing air to seek the path of least resistance therefore, resulted in most of the liquid vaporization occurring at the peripheral edges of the rotating screen discs as taught by the McElreath patent.

It is to be observed that the portions of the rotating screen disc located interiorally of the peripheral edges contain large amounts of liquid for vaporization which, as indicated in the McElreath patent, are largely unevaporated because of the tendency of the flowing air to make contact therewith in quantities insufficient to cause vaporization of the liquid. The McElreath patent further teaches the use of finger-like projections to increase the periphery of the discs in order to increase the efficiency of humidification.

The problem of causing the air flow past the rotating discs to make sufficient contact with the liquid carried by the interior portions of the rotating discs as pointed out in the McElreath patent were, of course, present in the earlier prior art devices referred to above.

The McElreath patent serves to summarize the problems of the prior art humidifiers using wire screen discs for the liquid to vapor transfer media. However, as may be implied from the teachings of the McElreath patent, those portions of the discs located interiorally of the peripheral edges are largely ineffective in the vaporization of the liquid due to the absence of sufficient air flow thereat. The McElreath patent further teaches the flexing of the wire screen discs to remove the scaling effect due to dissolved minerals in the liquid. This flaking of mineral precipitates into the air stream creates a problem with the transmission of such mineral particles throughout the structure being heated by the warm air furnace system.

SUMMARY OF INVENTION

With the prior art problem of humidifier efficiency in mind, applicant has provided means for significantly increasing the efficiency of a rotating screen disc humidifier.

The humidifier of the present invention comprises a housing adapted to be attached to an air duct or plenum of a warm air furnace system, said housing including a liquid reservoir, a shaft rotatably mounted on said housing, a plurality of wire screen discs mounted on said shaft and adapted for rotation through the liquid reservoir for a protion of each revolution of the rotatable shaft, said wire screen discs having a generally circular peripheral edge thereon and each disc including a generally axially extending ridge thereon for spacing each disc from an immediately adjacent disc and for further causing a substantially even distribution of the air flow thereacross in the interior portions of said screen discs whereby the vaporizing efficiency of the air flow mass is significantly increased.

The invention of the present application further contemplates the use of a novel air deflector means adapted to be removably secured to the humidifier housing for the purpose of further increasing the vaporizing efficiency of a humidifier by concentrating the air flow mass into direct contact with the liquid bearing discs.

The invention further contemplates the use, in combination with the basic humidifier sructure, of an automatic liquid flushing system whereby the increasing concentration of dissolved mineral substances in the reservoir, due to evaporation of the liquid, are flushed from the reservoir at regular time intervals thereby further increasing the vaporizing efficiency of the humidifier and further preventing undue corrosion of the humidifier elements and significantly reducing the tendency of the reservoir and associated parts from becoming scaled over by the deposition of mineral precipitates thereon thus even further increasing the operating efficiency of the humidifier.

There is further provided in the present invention a novel flexible drive coupling member for coupling the rotatable shaft to an appropriate rotary power source. The coupling is capable of adjusting for slight misalignments of the rotary power source with the rotatable shaft and further provides means for preventing the flow of liquid from the screen discs to the rotary power source and thereby prevents any potential damage which may result from the contact of said liquid with the rotary power source.

Having thus briefly summarized my invention, it is therefore a primary object of this invention to provide a novel, improved, highly efficient rotary screen disc humidifier.

It is another object of this invention to provide a humidifier having a novel liquid to vapor transfer media having the characteristics of increasing the efficiency of vaporization by a moving air stream.

A further object of this invention is to provide a humidifier having an improved dirve connection between a rotary power source and the liquid to vapor transfer media assembly.

A still further object of this invention is to provide a humidifier having an improved liquid to vapor transfer media assembly.

Still another object of this invention is to provide a humidifier wherein novel means are provided for increasing the air flow past the liquid to vapor transfer media.

Another object of this invention is to provide a humidifier having means for preventing undue scaling due to dissolved minerals in the liquid.

BRIEF DESCRIPTION OF THE DRAWING

Having thus summarized my invention and enumerated certain of the objects thereof, reference will now be made to the drawing wherein:

FIG. 15 shows the invention of the present case embodied in a plenum type humidifier.

DESCRIPTION OF THE PREFERRED EMBODIMENT

Figure 1:
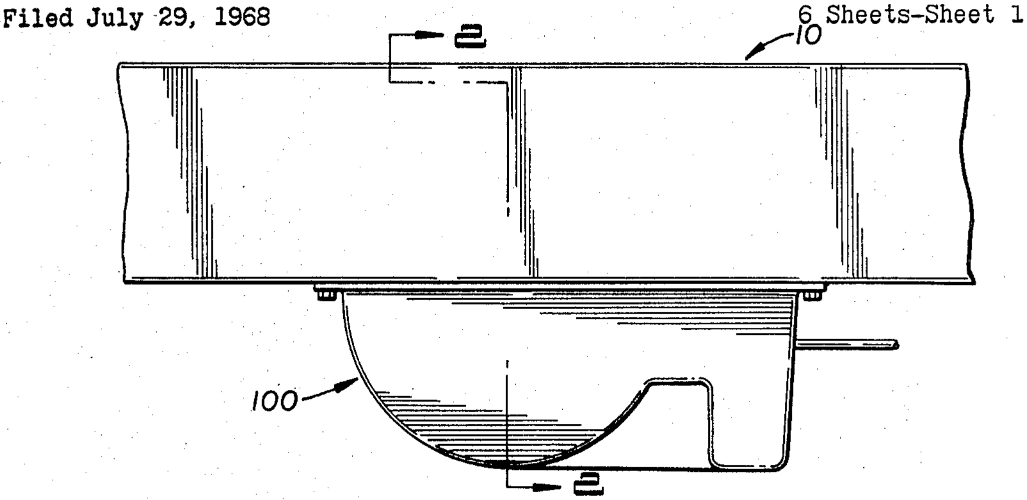
FIG. 1 is a side elevational view illustrating the humidifier of the present invention attached to an air duct of a warm air furnace system.

In FIG. 1 there is shown a humidifier 100 of the type adapted to be attached to a generally rectangular, horizontal warm air duct 10.

Figure 2:
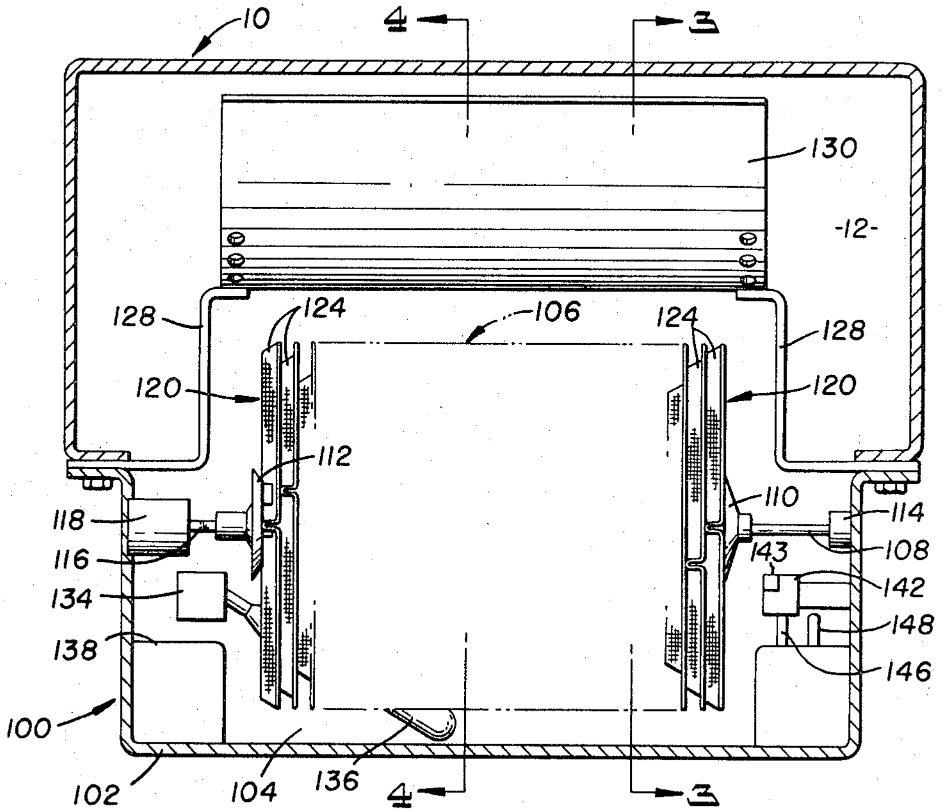
FIG. 2 is a sectional view taken along the line 2—2 of FIG. 1 in the direction of the arrows and illustrating the assembly of the humidifier of the present invention.

FIG. 2 is a sectional view taken along the line 2—2 of FIG. 1 and illustrates the humidifier 100 in greater detail. The humidifier 100 comprises a housing 102 secured to the air duct 10 by suitable removable fastening means.

The housing 102 defines a liquid reservoir 104 and supports for rotation therein, a liquid to vapor transfer media 106. The liquid to vapor transfer media 106 is supported for rotation on a shaft 108.

The shaft 108 extends through the transfer media 106, said media 106 being nonrotatable with respect to the shaft 108. The transfer media 106 is axially located on the shaft 108 by a shaft mounted cap member 110 and by a flexible drive coupling member 112. The shaft 108 is supported for rotation by a bearing 114, said bearing 114 being located in the housing 102, and by the drive shaft 116 adapted to be connected to a rotary power source 118. The rotary power source 118 being mounted on the housing 102.

The transfer media 106 comprises a plurality of wire screen discs 120 mounted on the shaft 108 for rotation therewith. The discs 120 extend from the shaft 108 into the liquid reservoir 104 and into a chamber 12 defined by the air duct 10.

Figure 3:
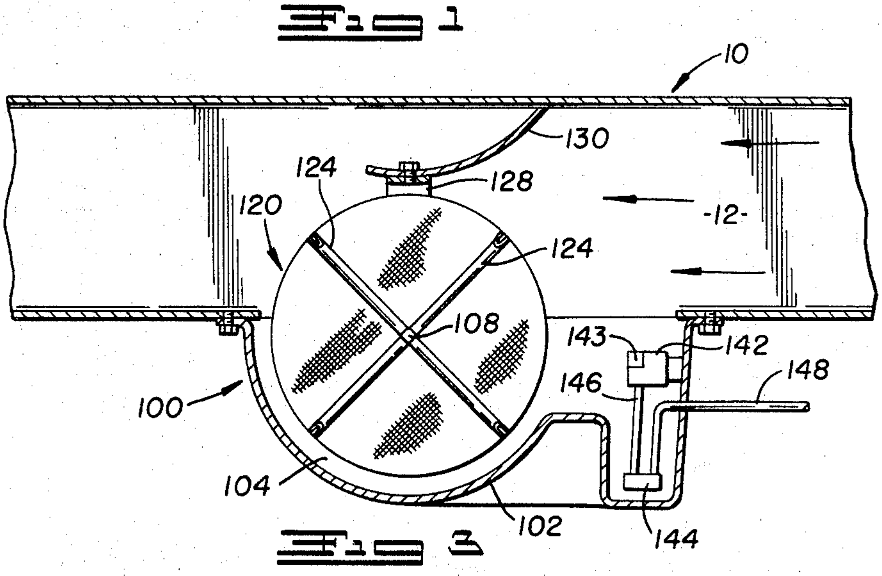
FIG. 3 is a sectional view taken along the line 3—3 of FIG. 2 in the direction of the arrows and illustrating certain features of the humidifier of FIG. 2.
Figure 5:
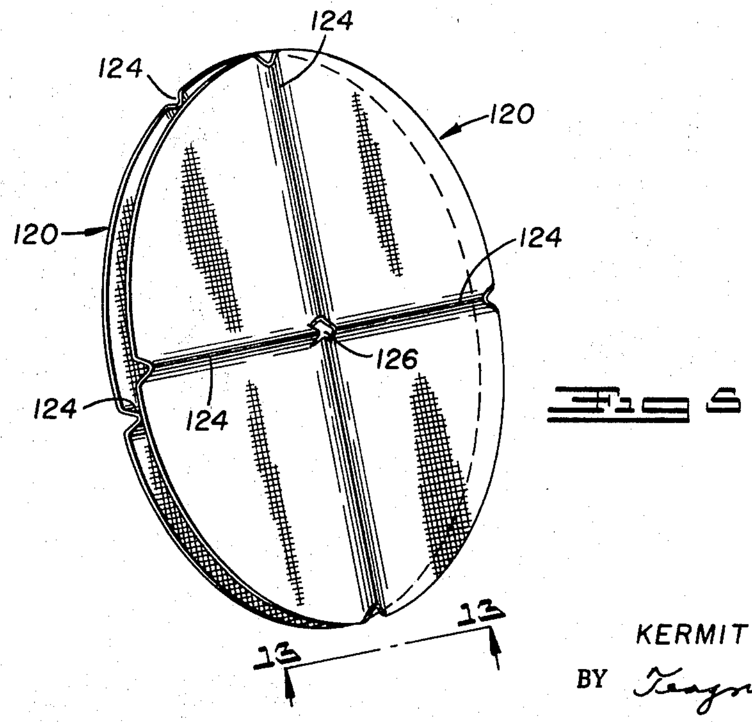
FIG. 5 is an isometric view of a pair of screen discs used as a liquid to vapor transfer medium in the humidifier.

As can be seen in FIG. 3, the discs 120 are generally circular in plan view and have a plurality of generally radially extending axial ribs 124 thereon. The ribs 124 serve to maintain the discs 120 in proper spaced relationship along the shaft 108. A pair of discs 120 is shown in detail in FIG. 5 and as can be seen there, the ribs 124 are formed by creasing the disc 120. At the center of the disc 120 is an aperture 126 for receiving the shaft 108. Beyond serving as spacing means, the ribs 124 cause the discs 120 to be more fixedly attached to the shaft 108 because of the resiliency provided by the ribs 124. A further important function of the ribs 124 will be hereafter described with regard to the operation of the humidifier 100.

Also shown in FIG. 2 is a pair of support members 128 mounted on the housing 102 and extending into the duct chamber 12. Removably secured to the support members 128 is an arcuate plate diverter 130. As can be seen in FIG. 2, the diverter extends from near the transfer media 106 to a point adjacent the duct 10.

Figure 4:
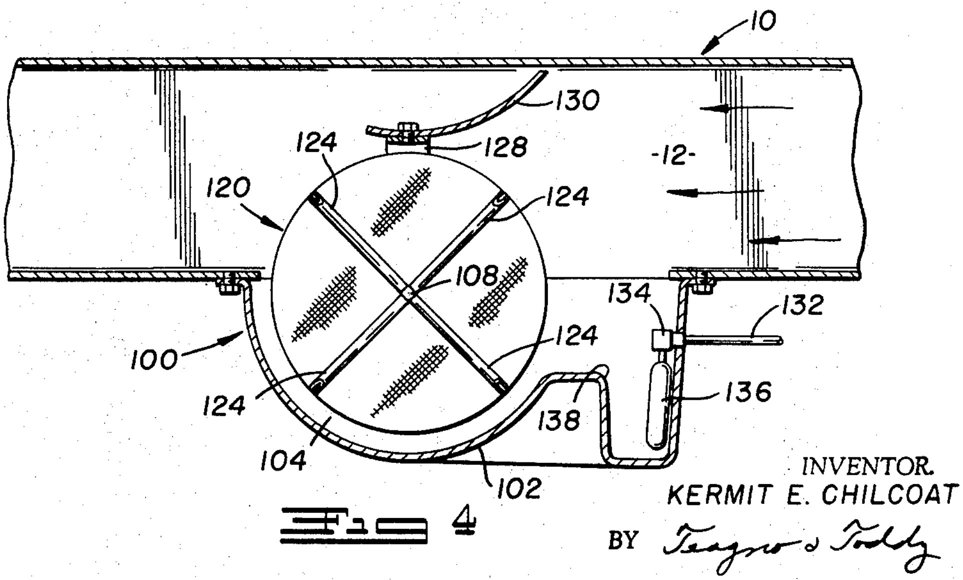
FIG. 4 is a sectional view taken along the line 4—4 of FIG. 2 and illustrating certain other features of the humidifier.

In operation, warm air from a furnace, not shown, would be flowing through the chamber 12 of the duct 10 in the direction of the arrows in FIGS. 3 and 4. The flowing air would be forced by the diverter 130 into contact with the transfer media 106.

The transfer media 106 is rotated slowly by the rotary power suorce 118, generally an electric motor and speed reduction unit, in either direction of rotation in FIGS. 3 and 4. As the media 106 passes through the reservoir 104, an amount of the liquid contained therein adheres to the media 106 and is rotated thereby into the flowing air stream for evaporation thereby.

The liquid, generally water, is supplied to the reservoir 104 through a tube 132 seen in FIG. 4, said tube 132 being connected to an appropriate source of pressurized liquid. The tube 132 passes through the housing 102 and is attached to a float actuated valve 134. A float 136 is connected to the control valve 134. Pressurized liquid flows from the source through the tube 132 and the control valve 134 into the reservoir 104 until there exists a quantity of liquid in the reservoir which submerses a portion of the media 106. The float 136 acts to close the control valve 134 once a predetermined liquid level is reached. The liquid level at which the control valve 134 is closed corresponds approximately to the housing surface 138.

As the media 106 is rotated, an amount of liquid, from the reservoir, adheres to each disc 120 of the media 106 and the adhering liquid is rotated into the air stream for vaporization. The purposeful withdrawal of liquid from the reservoir 104 for vaporization causes the liquid level to be lowered, thereby lowering the float 136 and opening the control valve 134 until the higher liquid level is again established. Thus, a proper operating quantity of liquid in the reservoir 104 is assured.

As is illustrated in FIG. 3 the humidifier 100 is also equipped with a motor 142 and a pump 144 driven thereby through a connection 146. The motor 142 is attached to the housing 102 above the highest liquid level of the reservoir 104. The pump 144 is located in the liquid reservoir 104 near the bottom thereof and has an outlet to a drain tube 148. The drain tube 148 extends through the housing 102, at a point above the highest reservoir liquid level, to a waste drain, not shown, located remote from the humidifier.

The function of the motor 142 and pump 144 is to pump, on a periodic basis, liquid from the reservoir 104 to a waste drain. As is known, the continual evaporation of liquid will cause any dissolved mineral content of the liquid to become concentrated and render the liquid less useful for humidification purposes. Therefore, on a periodic basis, controlled by a timing mechanism 143 incorporated into the motor 142, the entire liquid supply in the reservoir 104 is pumped away and a fresh supply of liquid is admitted by the action of the float 136 and control valve 134.

This periodic emptying and renewing of the liquid supply has been found to substantially increase the humidifying efficiency of the humidifier 100 and further substantially reduces mineral scaling of humidifier parts, such as float 136, reservoir 104, the media 106 and other related parts, thus further increasing humidifier efficiency and useful life.

The periodic emptying and renewing of the liquid supply has further been found to materially increase the service life of the humidifier media 120 and other metallic parts by maintaining the liquid in the reservoir as a relatively dilute electrolyte thereby reducing the deleterious effects of electrogalvanic corrosion, should there be present in the humidifier a galvanic circuit. Since galvanic circuits are practically impossible to prevent in humidifiers, maintenance of the liquid at the lowest level of impurity concentration thereby lessens the electrogalvanic corrosion and thereby increases the service life of the various humidifier components.

Further, chemical corrosion due to concentrated quantities of impurities in the humidifying liquid is also lessened by the maintenance of a dilute liquid in the reservoir due to the periodic emptying and renewing of the liquid supply. Therefore, humidifier service life is still further increased.

It can be further seen that the diverter 130, an arcuate plate member, when mounted as shown in FIGS. 3 and 4, serves to cause the flow of an increased quantity of warm air into direct contact with the media 106. This increased quantity of warm air over the media 106 serves to increase the humidifying efficiency in several ways. The first is the increased quantity of heat available for vaporization of the liquid with said increased quantity of heat being concentrated in the immediate vicinity of and in direct contact with the media 106 where the heat is capable of performing the vaporization of the liquid. Also, the diverter 130, by causing a concentrated air flow through the media 106, as will be more fully explained hereinafter, increases the humidifying efficiency by increasing the direct contact of the flowing air with a greater portion of the surface area of the individual discs 120 of which the media 106 is comprised. Further, the air flow over the media discs 120 serves to better distribute the liquid adhering thereto over a greater portion of the surface area thereof, thereby decreasing the liquid mass at localized portions of the discs 120 and as a result of the better distribution of the liquid allowing a better utilization of the quantity of heat contained in the air stream for vaporization, thereby further increasing the humidifying efficiency.

Figures 10, 11:
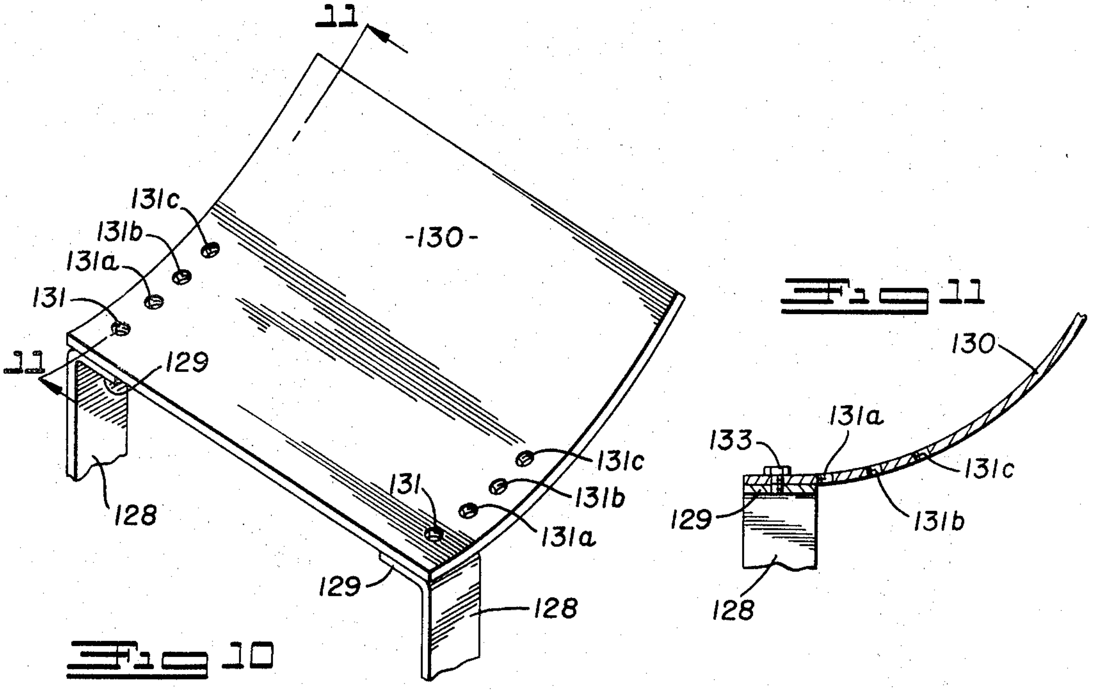
FIG. 10 is an isometric view illustrating a particular feature of the humidifier.
FIG. 11 is a sectional view of FIG. 10 taken along the line 11—11 thereof.

The diverter 130 is illustrated in detail in FIGS. 10 and 11 wherein, the diverter 130 is shown as an arcuate plate member having a plurality of aligned paired apertures 131, 131*a*, 131*b*, 131*c* therein. The paired apertures 131 are shown in FIG. 10 as being in aligned relationship with apertures in the flange 129 of the support member 128 and the diverter 130 secured to the flange 129 by fasteners 133. As can be seen, by selectively securing the diverter 130 to the flange 129 through the use of any of the paired apertures 131, 131*a*, 131*b* or 131*c*, it is possible to adjust the vertical position of the diverter 130 to allow use thereof with air ducts having varying vertical dimensions or to control the proportion of air flowing into direct contact with the media 106.

An important feature of the diverter 130 is that the radius of curvature thereof be greater than one-half the vertical dimension of the air duct to which the humidifier is to be attached. The significance of the radius of curvature being greater than one-half the vertical dimension of the air duct is that, regardless of the adjustment of the diverter 130 relative to the support member 128, the diverter 130 presents less than a 90° angle of attack, at the most extreme position of adjustment, with respect to the air stream. Having an angle of attack of less than 90° at the most extreme position, adjacent the air duct upstream of the humidifier, when coupled with the arcuately curved nature thereof, the diverter 130 maintains low turbulence air flow, relatively high air stream velocity and minimizes the pressure drop in the air stream due to the presence of the diverter 130.

Figures 12, 13:
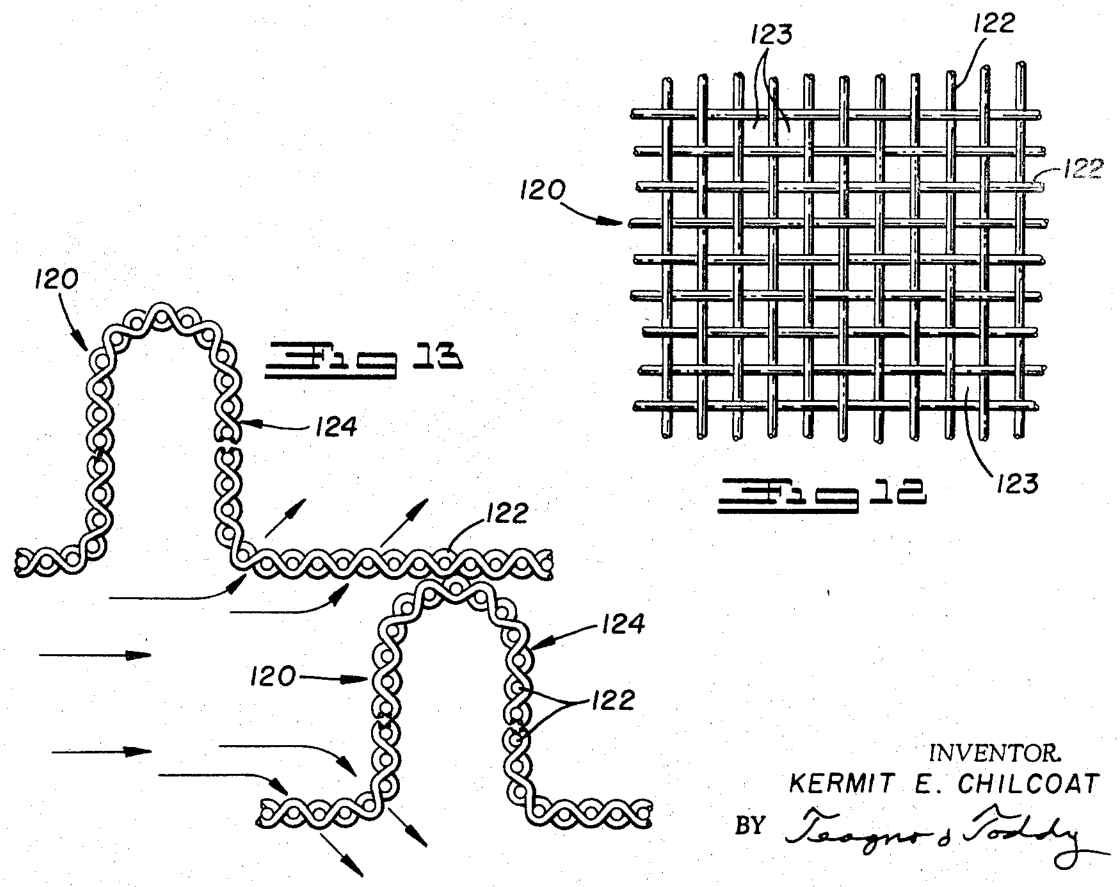
FIG. 12 is a detailed partial view of an element of the humidifier.
FIG. 13 is a detailed partial view of an element of the humidifier taken along the line 13—13 of FIG. 5.

The ribs 124 of the discs 120, of which the media 106 is comprised, further contribute to humidifying efficiency of the humidifier 100, as is illustrated in FIG. 13 by creating, due to the double thickness of screen forming the ribs 124, a pressure drop thereacross, which pressure drop is larger than the pressure drop across the disced portion of the discs 120 as illustrated in FIG. 12. Therefore, due to the principle that flowing fluids flow along the path of least resistance, the air will flow through the mesh 123 defined by the wire 122 of the discs 120 and the contact of the flowing air with the liquid adhering to the wire 122 is further increased. The air flow to the ribs 124 and through the mesh 123 is illustrated by the arrows in FIG. 13.

FIG. 13 further illustrates the proper angular misalignment of the ribs 124 of adjacent discs 120 to prevent the discs 120 from nesting with adjacent discs and thus destroying the desired disc spacing.

Figure 16:
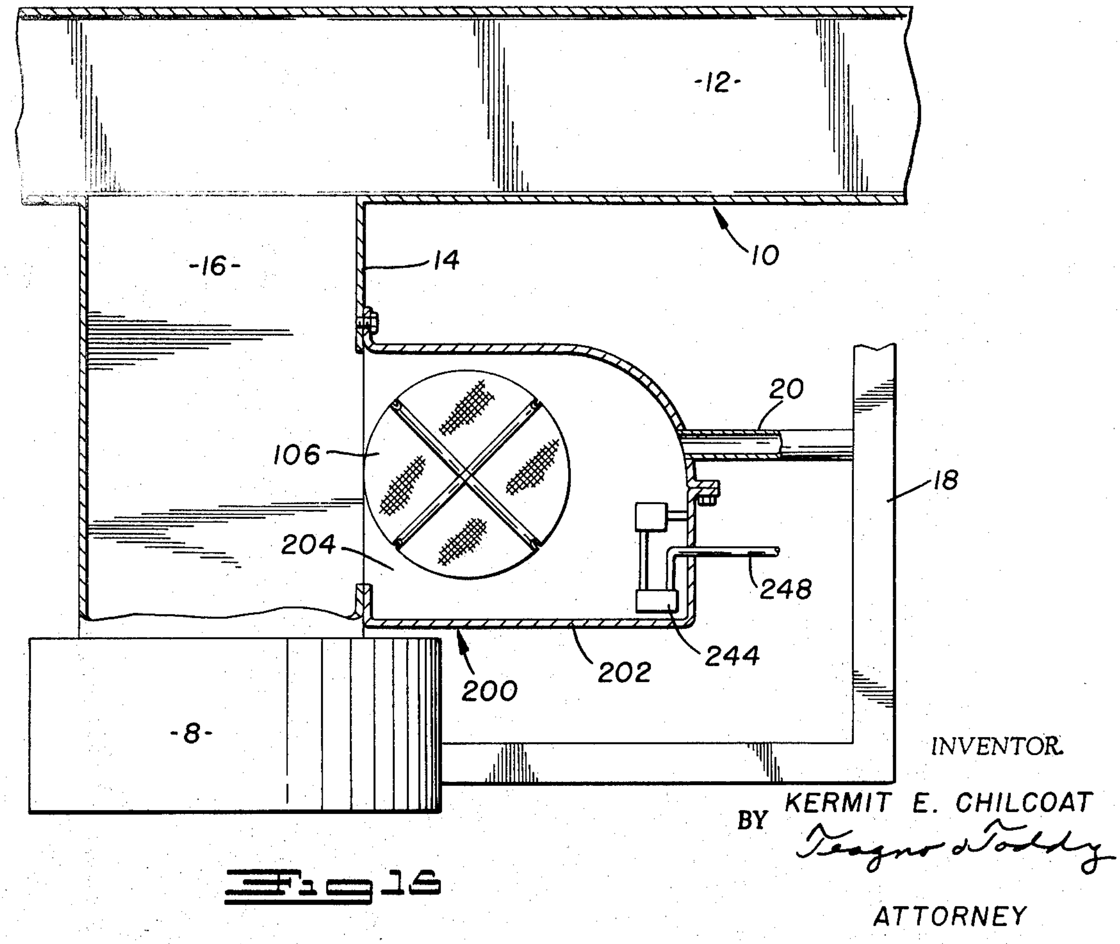
FIG. 16 illustrates a wire screen disc of the type used in the humidifier of the present invention.
Figure 16:
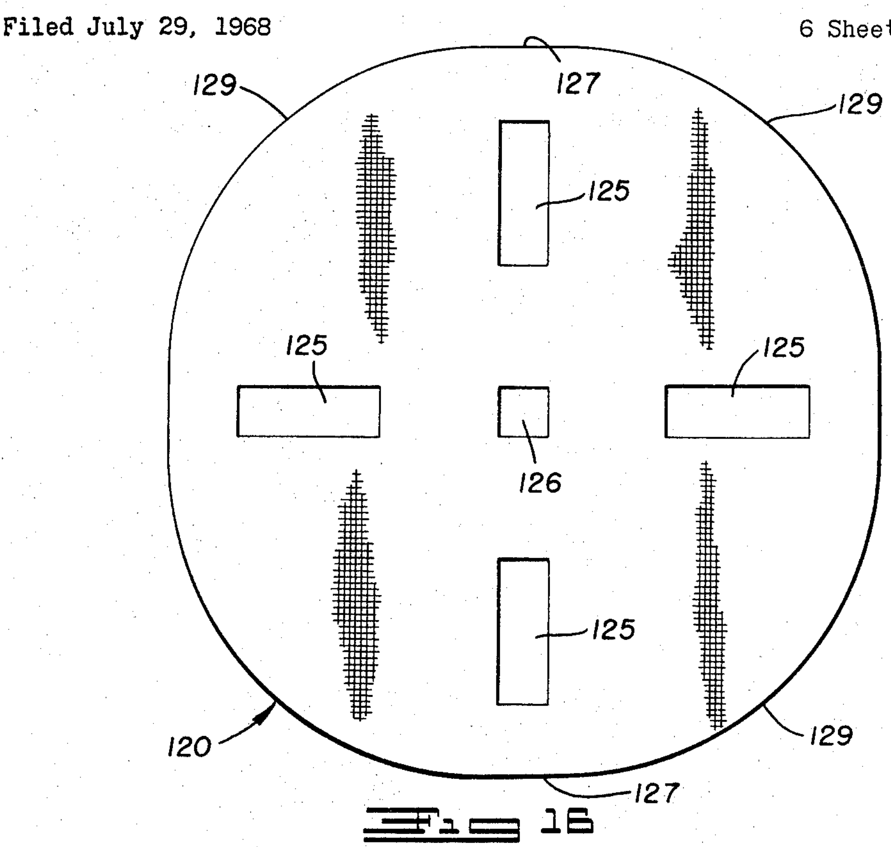

FIG. 16 illustrates a wire screen disc 120 as would be formed such as by stamping or other suitable cutting means from a wire screen sheet. In FIG. 16 it can be seen that the disc 120 comprises a sheet of screen material having an outer periphery defined by portions 129 having a common radius with said arcuate portions being separated into quadrants by portions 127 being generally flat and having no curvature. The disc 120 of FIG. 16 further comprises a central aperture 126 having sides corresponding to the flat portions 127 of the disc 120. Also shown in FIG. 16 is the provision of a plurality of openings 125 defined by the wire screen material. The flat portions 127 are provided on the periphery of the disc 120 for the purpose of generating axially extending ribs 124 as may be seen in FIGS. 5 and 17.

Figure 17:
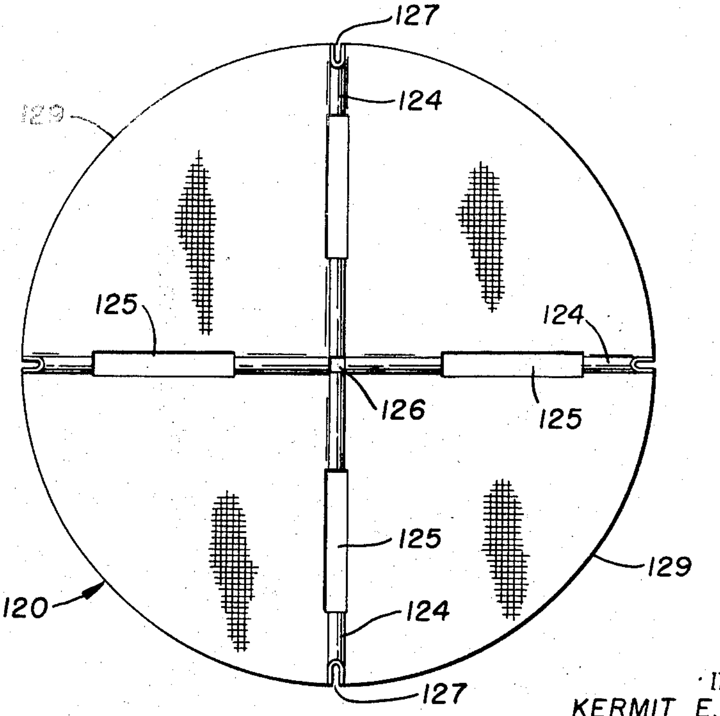
FIG. 17 illustrates the wire screen disc of FIG. 16 after the forming of axially extending ribs thereon.

FIG. 17 illustrates the wire screen disc of FIG. 16 after the axial ribs 124 have been formed therein. As can be seen in FIG. 17, the flat portions 127 are eliminated by the formation of the ribs 124 and the arcuate portions 129 are brought into a generally contiguous relationship such that the outer periphery of the disc 120 is generally circular. As can be further seen in FIG. 17, the central opening 126 of the disc 120 is similarly reduced in area by the elimination of the flat portions 127. When the discs 120 are in the formed condition of FIG. 17, the central opening 126 of the disc 120 is of lesser cross-sectional area than the drive shaft 108. Thus, when the discs 120 are assembled on the shaft 108 the central opening 126 is forced to expand against the radial resiliency caused by the existence of the ribs 124. This resiliency provided by the ribs 124 causes the disc 120 to nonrotatably engage the shaft 108 in a satisfactory manner.

The screen material of the discs 120 may be of any commonly available woven wire material, although a preferred wire screen material would be a lacquer coated commercial bronze screen in order to lessen the corrosive effect of dissolved minerals and corrosive chemicals commonly found in liquids used for humidification purposes.

When the discs 120 of FIG. 17 embodying the openings 125 are used in the media 106 the air flowing across the discs 120 is interrupted and caused to flow as illustrated in FIG. 13 and additionally, is caused to flow through the openings 125 and thereby increasing the turbulence of the air flow and further increasing the vaporizing effectiveness of the air as it flows through the openings 125 and into contact with an adjacent disc.

Figure 6:
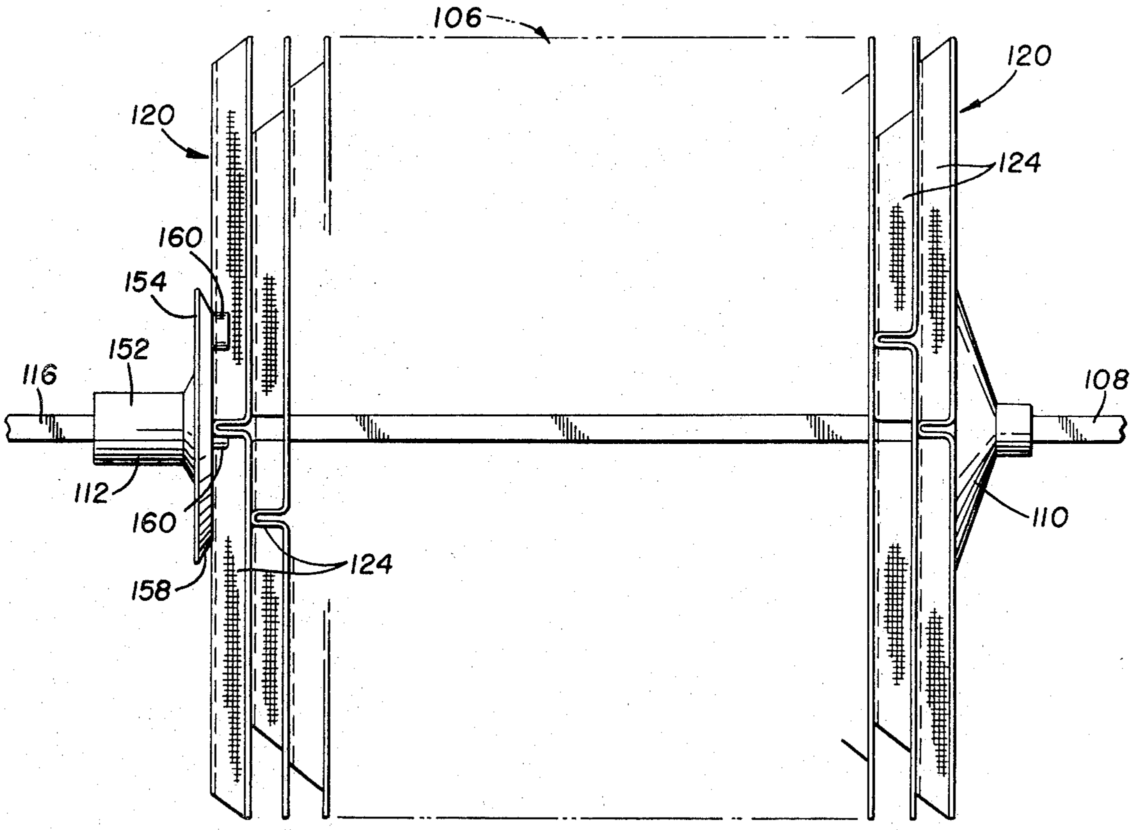
FIG. 6 illustrates a plurality of screen discs, as assembled for use in the humidifier, in detail.

FIG. 6 illustrates an assembled media 106 in detail and further shows the angular misalignment of the ribs 124 and further illustrates in greater detail the construction of the media 106 with discs 120 being located on the shaft 108 by an end cap 110 and a flexible liquid shielding coupling 112.

Figures 7, 8, 9:
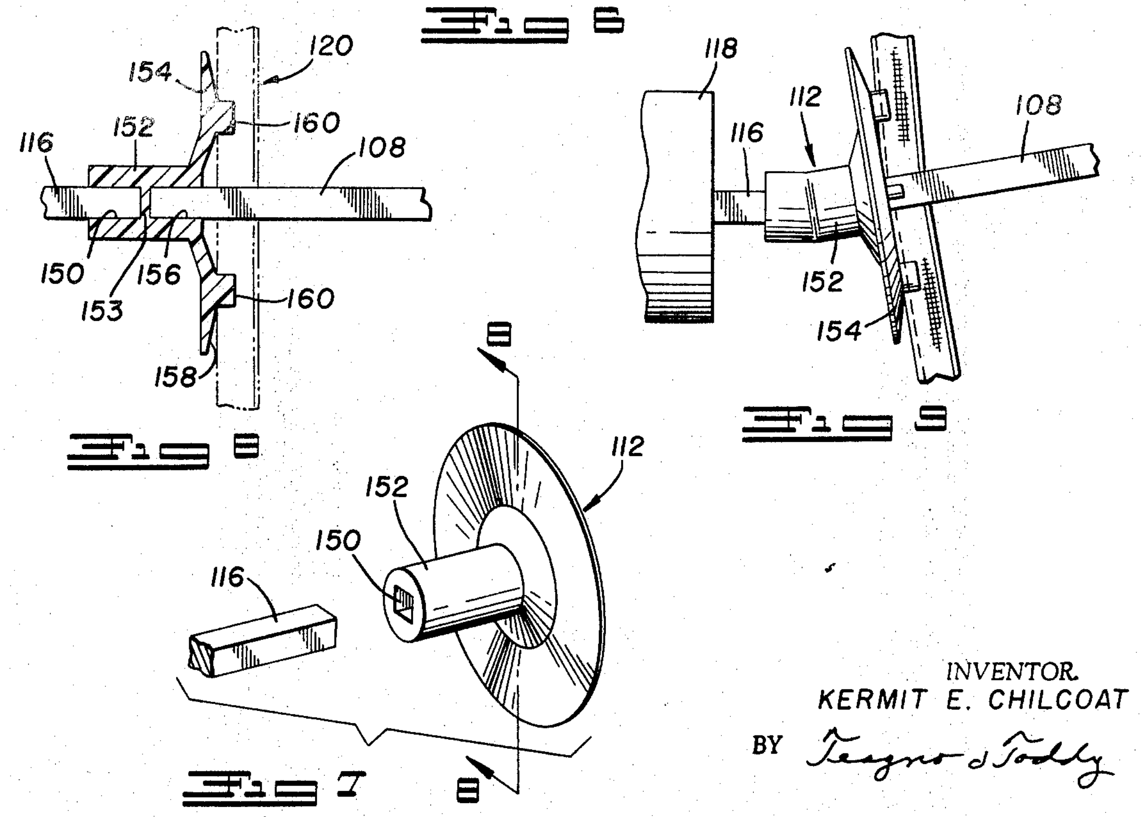
FIG. 7 is an exploded isometric view of a portion of the humidifier drive assembly and particularly illustrating the flexible drive and water diverting coupling.
FIG. 8 is a sectional view of the flexible coupling taken along the line 8—8 of FIG. 7.
FIG. 9 is an isometric view of the flexible coupling illustrating the flexed position thereof.

The flexible coupling 112 and media 106 driving assembly is shown in even greater detail in FIGS. 7, 8 and 9. In FIG. 7 it can be seen that the drive shaft 116 is adapted to cooperate with bore 150 in a cylindrical, flexible portion 152 of the coupling 112. The coupling 112, as can further be seen in FIG. 7, also comprises a radially extending flange portion 154. As can be seen in FIG. 8, the cylindrical portion 152 has a transverse web 153 extending across the motor shaft bore 150 and media shaft bore 156 for locating the shafts 116 and 108 with respect to the coupling 122 and breaks any galvanic circuit thereby reducing the corrosive and destructive effects of electrogalvanic action. Also shown in FIG. 8 is an angularly inclined annular surface 158 on the flange portion 154 of coupling 112. The surface 158 of the flange 154 serves as a liquid shield for protecting the power source 118. The surface 158 collects liquid droplets or streams falling thereon and diverts the liquid back to the screen discs 120, thereby preventing damage to the power source 118 from the liquid. The flange 154 further comprises a plurality of tabs 160 extending axially therefrom. As can be seen in FIG. 6, the tabs 160 contact the ribs 124 of the discs 120 and provide a driving connection therebetween.

FIG. 9 illustrates flexure of the cylindrical portion 152 of the coupling 112. The coupling 112 permits operation of the humidifier with slight misalignment of the motor shaft 116 and the media shaft 108 and further provides for easy assembly and inspection of the media 106.

With the various elements and features of the humidifier described, a summary of the operation of the humidifier will now be described.

With the humidifier 100 attached to a warm air duct 10 of a furnace system, the rotary power source 118 and the pump motor 142 connected with an energy source, the supply tubing 132 connected with a source of liquid pressure and the flushing tubing 148 positioned in a drain the humidifier is ready for operation.

The reservoir 104 is supplied with an appropriate quantity of liquid controlled by the float 136 and control valve 134. The rotary power source 118 rotates the media 106 through the liquid and into the flowing air where the liquid adhering to the screen discs 120 is vaporized. On a periodic basis, controlled by a timing mechanism in the pump motor 142, the pump motor 142 and pump 144 are operated to remove from the reservoir 104, liquid which has an increased concentration of dissolved minerals due to evaporation of a part of the liquid therefrom by the designed evaporation from the media 106 thereby reducing chemical corrosion, scaling, and further, weakening the electrolytic nature of the liquid so as to reduce electrogalvanic corrosion due to any galvanic circuits which may exist in the humidifier.

The diverter 130, adjustable to fit various sized ducts and to predetermine the desired quantity of air flow, diverts a predetermined portion of the flowing air stream into direct contact with the media 106 for improving the humidifying efficiency of the humidifier in a manner described above. While passing the media 106, the flowing air is further diverted by the ribs 124 on the discs 120 to further increase the humidifying efficiency, said ribs further serving as spacing means between adjacent screen discs 120. The ribs 124 further serving to resiliently bias the discs 120 into nonslipping engagement with the media shaft 108. The rotary power source 118 drives the media 106 through a flexible, liquid shielding coupling 112 which allows minor misalignment of the rotary power source 118 and the media shaft 108 and further serves to prevent the flow of liquid from the media 106 to the rotary power source 118 thereby preventing liquid-caused damage thereto.

Figure 14:
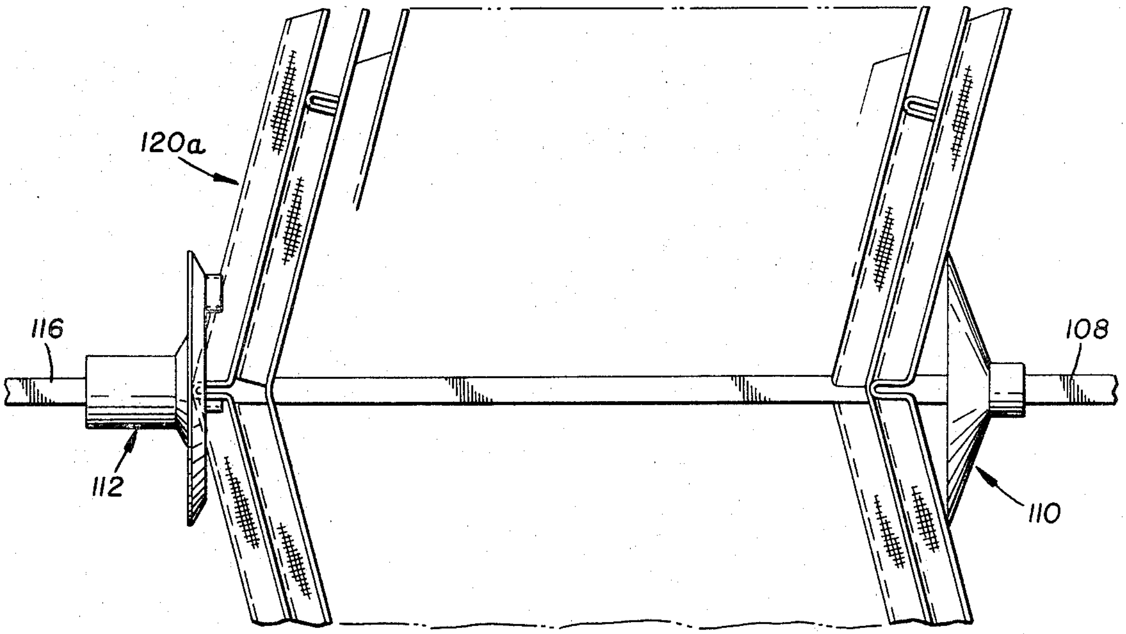
FIG. 14 is similar to FIG. 5 and illustrates a modified form of wire screen discs.

In FIG. 14 there is illustrated the use of coned discs 120*a* which may be used in the place of the substantially parallel discs 120 previously described. The coned discs 121*a* further serve to increase humidifying efficiency by requiring further changes in air flow direction during passage over the media 106.

A further adaptation of the invention of this case is shown in FIG. 15 wherein the humidifier 200 is located on the plenum 14 of a warm air furnace 8. The housing 202 of the humidifier 200 would contain the media 106, a reservoir 204, pump motor 242 and pump 244 and drain tube 248 and all other parts of the humidifier 100 described above. In addition, a conduit 20 would be provided to a lower pressure cold air return duct 18.

The higher pressure warm air from the plenum chamber 16 would thereby flow across the media 106 and be humidified in the manner described for the duct humidifier 100.

Having thus described my invention and various embodiments thereof, it will be immediately obvious to those skilled in the art, that I have made a significant contribution to the state of the art for which patent protection as defined by the appended claims is requested.

I now claim:

1. A humidifier for increasing the liquor vapor content of a moving, heated air stream from a hot air furnace system, said furnace system including a generally horizontally extending air duct, said humidifier comprising:
- a housing adapted to be secured to the air duct, said housing defining a liquid reservoir;
- a liquid to vapor transfer media adapted to be positioned in the moving air stream and including a shaft rotatably mounted on the housing and a plurality of wire screen discs mounted on the shaft and extending into the reservoir, each of said discs having a plurality of generally radically extending, axial ribs formed from the screen discs and extending from the center thereof across a substantial portion of the disc resiliently biasing the discs into driving engagement with said shaft, and
- a rotary power source operatively associated with the shaft for causing rotation thereof.

2. A humidifier as defined in claim 1 further comprising:
- a liquid control assembly mounted on the housing and including a float actuated valve adapted to be connected to a source of pressurized liquid and a float associated with the valve for controlling the operation thereof;
- said float extending into said liquid reservoir and movable in response to the level of liquid therein, said movement being effective to control the operation of the valve.

3. A humidifier as defined in claim 2 further comprising:
- a motor mounted on the housing;
- a pump adapted to be driven by the motor and associated therewith, the pump extending into the liquid reservoir for pumping liquid therefrom during operation of the motor;
- timing means operatively associated with the motor for controlling the operation thereof on a periodic basis; and
- liquid conduit means associated with the pump for delivering liquid to a point remote from the humidifier during said periodic operation of the motor.

4. A humidifier for increasing the liquid vapor content of a moving air stream, said humidifier comprising:
- a housing defining a liquid reservoir and having an air flow passage therethrough;
- a liquid to vapor transfer media for transporting liquid from the reservoir to the air flow passage, said media including a shaft rotatably mounted on the housing and a plurality of wire screen discs mounted on the shaft and extending into the reservoir, each of said discs having a plurality of generally radically extending, axial ribs formed from the screen discs and extending from the center thereof across a substantial portion of the disc resiliently biasing the discs into driving engagement with the shaft, and
- a rotary power source operatively associated with the shaft for causing rotation thereof.

5. A humidifier as defined in claim 4 further comprising:
- a liquid control assembly mounted on the housing and including a float actuated valve adapted to be connected to a source of pressurized liquid and a float associated with the valve for controlling the operation thereof;
- said float extending into said liquid reservoir and movable in response to the level of liquid therein, said movement being effective to control the operation of the valve.

6. A humidifier as defined in claim 4 further comprising:
- a motor mounted on the housing;
- a pump adapted to be driven by said motor and associated therewith, said pump extending into the liquid reservoir for pumping liquid therefrom during operation of the motor;
- timing means operatively associated with said motor for controlling the operation thereof; and
- liquid conducting means associated with the pump for delivering liquid to a point remote from said reservoir during operation of the motor and pump.

7. A humidifier as defined in claim 4 wherein the axial ribs further serve to maintain the individual discs in spaced relationship.

8. A humidifier as defined in claim 4 wherein the axial ribs formed from the screen discs comprise a double thickness of wire screen.

9. A humidifier comprising:
- a housing defining a liquid reservoir;
- a liquid to vapor transfer media rotatably mounted on the housing and extending into the liquid reservoir, said media including a plurality of wire screen discs, said discs having a generally circular periphery, each of said discs having a generally radially extending, axial rib thereon, said rib being formed from the wire screen disc and extending from the center across a substantial portion of the disc, means for maintaining ribs on adjacent discs out of alignment for the purpose of maintaining adjacent discs in spaced relationship and for adding rigidity to the media; and
- rotary power means mounted on the housing and drivingly connected to the media.

10. The humidifier of claim 9 wherein each of the discs have an opening therein, said opening being larger in area than the mesh of the screen.

11. The humidifier of claim 10 wherein the opening defined by the discs are generally radially extending and elongate.

12. A liquid to vapor transfer media for use in a humidifier having a housing defining a liquid reservoir and a rotary power source, said transfer media comprising:

a shaft adapted to be rotatably supported in said housing;

a plurality of wire screen discs nonrotatably mounted on the shaft and having at least a substantial portion of each disc spaced from adjacent discs;

means for axially locating the plurality discs at a first position on the shaft; and a flexible coupling member adapted to be operatively associated with the rotary power source and the shaft for rotatably driving the shaft and the discs and for locating the discs on the shaft as a second position, said coupling including a first portion permitting radial flexing between the rotary power source and the shaft, a second portion defining a surface away from the rotary power source and adjacent a disc, said surface being inclined with respect to the discs such that there exists a radially diverging groove defined by the surface and the adjacent disc, whereby liquid collecting on the surface will flow toward the adjacent disc.

13. The transfer media of claim 12 wherein the flexible coupling further comprises:

means on said second portion for engaging the adjacent disc.

14. In a humidifier having a housing defining a reservoir for liquid to be vaporized, a shaft rotatably mounted in said housing, means mounted on said housing for drivingly rotating said shaft, a screen disc disposed on said shaft, and means providing driving engagement between said disc and said shaft;

the improvement wherein said means providing driving engagement comprises:

said disc having an aperture through which said shaft is to be inserted, said aperture being smaller than said shaft;

a rib on said disc formed from the body of said disc, said rib having one end adjacent said aperture and extending across a substantial portion of the disc; and said rib cooperating with the periphery of said aperture to resiliently bias said disc into driving engagement with said shaft when said shaft is located in said aperture.

15. A humidifier for increasing the liquid vapor content of a moving, heated air stream from a hot air furnace system, said furnace system including a generally horizontally extending air duct, said humidifier comprising:

a housing adapted to be secured to the air duct, said housing defining a liquid reservoir;

a liquid to vapor transfer media positioned between the reservoir and the moving air stream and including a shaft rotatably mounted on the housing;

a rotary power source operatively associated with the shaft for causing rotation thereof;

a support member mounted on the housing and extending into said duct when said humidifier is secured thereto to a distance greater than one-half of the vertical dimension of said duct; and an arcuate plate diverter, removably secured to the support member and adjustable with respect thereto along an arcuate surface of the diverter, the diverter having a continuous radius of curvature greater than one-half the vertical dimension of the air duct to which the humidifier housing is adapted to be attached and an arcuate length greater than one-half of the vertical dimension of the air duct to which the humidifier is adapted to be attached, whereby when the humidifier housing is attached to said air duct, the diverter cannot be adjusted to a position so as to generate a surface transverse to the air flow in the duct.

References Cited

UNITED STATES PATENTS

| | | | |
|---|---|---|---|
| 2,288,981 | 7/1942 | Viebrock. | |
| 2,847,989 | 8/1958 | Powers et al. | |
| 3,189,328 | 6/1965 | Hotchkiss et al. ---- | 261—92 X |
| 3,294,378 | 12/1966 | Grimes ------------- | 261—92 |
| 3,229,966 | 1/1966 | Kilgore ------------- | 261—92 |
| 3,339,902 | 9/1967 | Martin. | |
| 3,441,256 | 4/1969 | Worsfold. | |

FRANK W. LUTTER, Primary Examiner

S. H. MARKOWITZ, Assistant Examiner

PO-1050
(5/69)

UNITED STATES PATENT OFFICE
CERTIFICATE OF CORRECTION

Patent No. 3,529,810 Dated September 22, 1970

Inventor(s) Kermit E. Chilcoat

It is certified that error appears in the above-identified patent and that said Letters Patent are hereby corrected as shown below:

Col. 3, line 37 - "protion" should read --portion--.

line 57 - "sructure" should read --structure--.

Col. 4, line 9 - "dirve" should read --drive--.

Col. 5, line 46 - "suorce" should read --source--.

Col. 8, line 33 - "122" should read --112--.

Col. 9, line 54 - "radically" should read --radially--.

Col. 10, line 19 - "radically" should read --radially--.

Col. 11, line 15 - "as" should read --at--.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents